J. M. WHITING.
Car Wheel and Axle.
No. 200,884. Patented March 5, 1878.
Fig. 1.
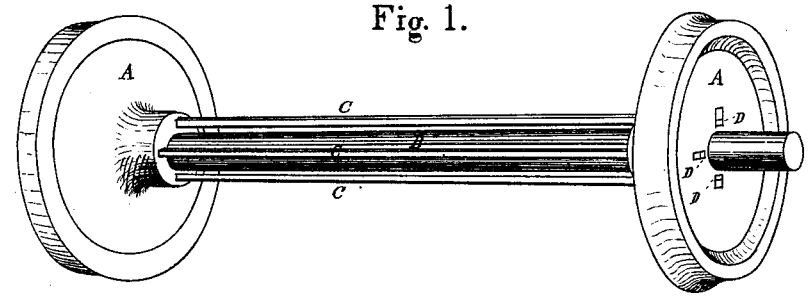
Fig. 2.
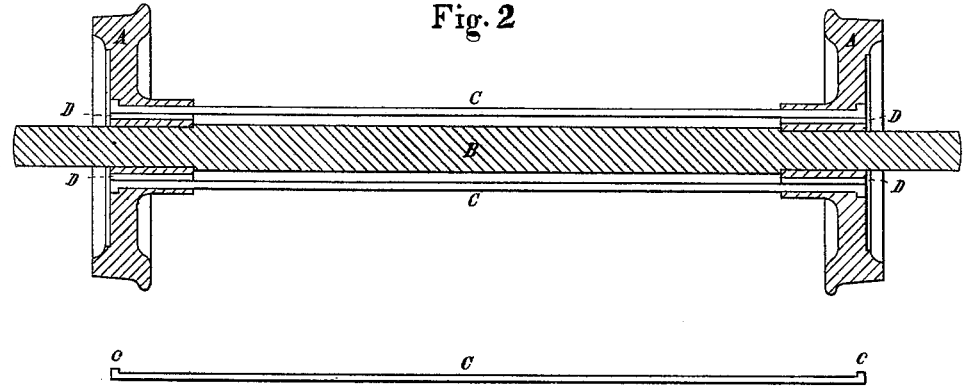
Fig. 3.
WITNESSES.  
Walter B. Vincent  
Henry C. Knight
INVENTOR.  
James M. Whiting

UNITED STATES PATENT OFFICE.

JAMES M. WHITING, OF PROVIDENCE, RHODE ISLAND, ASSIGNOR OF ONE-HALF HIS RIGHT TO EDMUND H. WHITING, OF SAME PLACE.

IMPROVEMENT IN CAR WHEELS AND AXLES.

Specification forming part of Letters Patent No. 200,884, dated March 5, 1878; application filed November 19, 1877.

*To all whom it may concern:*

Be it known that I, JAMES M. WHITING, of Providence, in the State of Rhode Island, have made certain new and useful Improvements in Car-Wheel Axles; and I do hereby declare that the following specification, taken in connection with the drawing, making a part of the same, is a full, clear, and exact description thereof.

Figure 1 is a perspective view of my invention. Fig. 2 is a section of same. Fig. 3 shows the construction of the rods C.

The object of my invention is to construct the car wheel and axle, and connect them together in such a manner that the wear and strain, as well as the liability to accident in passing over curved and uneven portions of the track, may be greatly diminished; and consists in the improvements hereinafter described.

The car-wheels now in use are commonly forced onto their axles, the whole rotating together as the car moves over the track. The two wheels being connected by and firmly attached to their axle, are compelled at all times to act in unison, whatever the irregularities of the track may be. The natural tendency, in passing over a curve, of the wheel upon the lower side to advance more rapidly than the other, as well as the sudden detention of one wheel in passing over an uneven surface or slight obstruction, produces a sudden strain upon both track and rolling-stock, increases the liability to accident, and results in the unnecessary wear of the whole.

In my invention, A A, Figs. 1 and 2, are car-wheels of the ordinary form rotating upon the axle B, which extends beyond the wheels at either end in the usual way. C C C C, Figs. 1, 2, and 3, are steel rods running parallel with and in close proximity to the axle B, and connecting the wheels A A. The rods C pass through the wheels, and are secured by a key introduced from the outside, and retain the wheels upon the axle.

It will now be readily seen that the wheels, being connected by the rods C, will rotate together upon the axle B, except that in passing over any curved or uneven portion of the track any increased resistance coming to one wheel the rods will spring sufficiently to prevent any sudden strain or shock.

In my invention I do not limit myself to any particular number of rods, as a greater or less number may be used with good effect.

What I claim as my invention, and desire to secure by Letters Patent, is—

The combination of a series of horizontal elastic rods, each of which extends across from wheel to wheel, with a pair of car-wheels and their axles, substantially as set forth.

JAMES M. WHITING.

Witnesses:
WALTER B. VINCENT,
HENRY C. KNIGHT.